United States Patent [19]

Kanakura et al.

[11] Patent Number: 5,202,215
[45] Date of Patent: Apr. 13, 1993

[54] METHOD OF PRODUCING A TONER COMPRISING SILICONE CONTAINING ORGANIC RESIN MICROPARTICLES

[75] Inventors: Akihiro Kanakura, Hirakata; Koichi Fukuda, Suita; Chikayuki Otsuka, Kadoma; Masayuki Maruta, Neyagawa; Naoya Yabuuchi, Suita, all of Japan

[73] Assignee: Nippon Paint Co., Ltd., Osaka, Japan

[21] Appl. No.: 666,667

[22] Filed: Mar. 7, 1991

[30] Foreign Application Priority Data

Mar. 7, 1990 [JP] Japan .................................. 2-56255

[51] Int. Cl.$^5$ .......................................... G03G 9/087
[52] U.S. Cl. ............................ 430/137; 430/109; 430/110; 430/111
[58] Field of Search .............. 430/137, 904, 110, 106, 430/109, 111

[56] References Cited

U.S. PATENT DOCUMENTS

| | | | |
|---|---|---|---|
| 4,514,487 | 4/1985 | Kasuya et al. | 430/137 |
| 4,568,625 | 2/1986 | Ughiyama et al. | 430/110 |
| 4,592,990 | 6/1986 | Takagi et al. | 430/137 |
| 4,617,249 | 11/1986 | Ober et al. | 430/137 |
| 4,758,491 | 7/1988 | ALexandrovich et al. | 430/110 |
| 4,770,968 | 9/1988 | Georges et al. | 430/108 |
| 4,868,086 | 9/1989 | Ohtani et al. | 430/137 |
| 5,059,505 | 10/1991 | Kashihara et al. | 430/110 |

FOREIGN PATENT DOCUMENTS

| | | |
|---|---|---|
| 314158 | 5/1989 | European Pat. Off. . |
| 0198609 | 9/1989 | Japan . |

Primary Examiner—Marion E. McCamish
Assistant Examiner—Rosemary Ashton
Attorney, Agent, or Firm—Wenderoth, Lind & Ponack

[57] ABSTRACT

The present invention provides a toner which substantially excludes off set and blocking of the toner particles, and a process for preparing the toner. The toner is prepared by dispersion-polymerizing a vinyl monomer in the presence of a dispersion polymerization stabilizer, a polymerization initiator and silicone-containing organic resin microparticles in a dispersion medium which dissolves said vinyl monomer, dispersion polymerization stabilizer and polymerization initiator and which does not dissolve said silicone-containing organic resin microparticles and resulting toner particles.

13 Claims, No Drawings

METHOD OF PRODUCING A TONER COMPRISING SILICONE CONTAINING ORGANIC RESIN MICROPARTICLES

FIELD OF THE INVENTION

The present invention relates to a process for preparing a toner which includes silicone-containing organic resin microparticles, and the resulting toner.

BACKGROUND OF THE INVENTION

In electrophotography, a toner to which an electric charge has been given by rubbing with carrier particles is moved onto an electrostatic latent image with the opposite electric charge on a photosensitive member, and the imaged toner is then transferred onto a substrate like paper to realize the image. The substrate is then contacted with a heat roll to fix the image on the substrate. The heat roll is made from a material to which the toner does not adhere, but there is still a problem that a portion of the toner is adhered on the heat roll and will leave a thin image on the next substrate, which is called "off set".

In order to avoid the off set, Japanese Kokai Publication 106073/1989 proposes that silicone-containing polymer microparticles be mixed with a toner mixture. However, it takes a long period of time to form a uniform mixture of the silicone-containing polymer microparticles and the toner mixture. The resulting toner mixture may often cause blocking of toner particles. If carrier particles are also mixed in the toner mixture, the silicone-containing polymer microparticles are adhered onto the carrier particles and adversely affect the charge properties of the carrier particles.

Japanese Kokai Publication 137264/1989 discloses that a toner is prepared by a suspension-polymerization in the presence of a remover polymer, such as silicone oil, mineral oil and the like. In this technique, however, the remover polymer is unstable in a polymerization system and therefore adversely affects the blocking properties of the toner. The amount of the remover polymer introduced has a certain limitation, or is insufficient.

SUMMARY OF THE INVENTION

The present invention provides a toner which substantially excludes the off set and the blocking of the toner, and a process for preparing the toner. The toner is prepared by dispersion-polymerizing a vinyl monomer in the presence of a dispersion polymerization stabilizer, a polymerization initiator and silicone-containing organic resin microparticles in a dispersion medium which dissolves said vinyl monomer, dispersion polymerization stabilizer and polymerization initiator and which does not dissolve said silicone-containing organic resin microparticles and resulting toner particles.

DETAILED DESCRIPTION OF THE INVENTION

The silicone-containing organic resin microparticles can be any organic resin microparticles in which silicone is present. The silicone may exist in the particles in any form, such as absorption, chemical bond and the like. The resin microparticles may be prepared by any method, for example, a method wherein silicone is absorbed in organic resin microparticles, a method wherein a silicone emulsion is employed as a seed and an emulsion polymerization of an acryl monomer is conducted thereon, a method as shown in Japanese Kokai Publications 106614/1986, 81412/1987 and 98609/1989 wherein silicone is grafted with acryl polymer. It is preferred that the silicone has a viscosity of 10 to 10,000 cp, more preferably 50 to 2,000 cp, and includes various types of commercially available silicone oil. When the viscosity is less than 10 cp, it is difficult to incorporate the silicone into toner particles and the silicone present inside the particles is easily moved onto the surface of the particles and deteriorates blocking properties. When the viscosity is more than 10,000 cp, the silicone is hardly moved onto the surface and therefore can not inhibit the off set. The silicone may be branched, but if it is highly branched the silicone becomes difficult to move onto the surface and has poor inhibition of off set. The silicone may be modified with an acid, an amine and the like. The weight ratio of the silicone/organic resin microparticles is preferably within the range of 80/20 to 5/95.

The silicone-containing organic resin microparticles preferably have an average particle size of 0.03 to 1.0 micron, more preferably 0.07 to 0.5 micron. When the average particle size is less than 0.03 micron, it is difficult to produce such small microparticles and to incorporate small microparticles into the toner particles. When the average particle size is more than 1.0 micron, the silicone is not uniformly present in the toner particles and is easily moved onto the surface, which causes poor blocking properties. It is required that the silicone-containing organic resin microparticles be insoluble in the dispersion medium. The silicone-containing resin microparticles are present in an amount of 0.1 to 30.0% by weight (i.e. 0.005 to 24.0% by weight calculated in terms of the silicone) based on an amount of the vinyl monomer. Amounts of less than 0.1% by weight often cause problems of off set and amounts of more than 30.0% by weight provide poor blocking properties.

The vinyl monomer employed in the present invention can be anyone which is used for toner, and preferably includes styrene and other monomers. Examples of the other monomers are alkyl (meth)acrylates, such as methyl (meth)acrylate, ethyl (meth)acrylate, n-butyl (meth)acrylate, 2-ethylhexyl (meth)acrylate and the like; hydroxyl group-containing monomers, such as 2-hydroxyethyl (meth)acrylate, hydroxypropyl (meth)acrylate, hydroxybutyl (meth)acrylate, allyl alcohol, methallyl alcohol and the like; carboxyl group-containing monomers, such as (meth)acrylic acid and the like; polymerizable amides, such as (meth)acrylamide and the like; polymerizable nitriles, such as (meth)acrylonitrile and the like; glycidyl (meth)acrylate; polyfunctional monomers, such as divinylbenzene, divinyl ether, ethyleneglycol dimethacrylate, polyethyleneglycol dimethacrylate, neopentylglycol dimethacrylate, trimethylolpropane trimethacrylate, diallyl phthalate and the like.

The polymerization initiator of the present invention can be one which is known to the art, including peroxides, such as benzoyl peroxide, di-t-butyl peroxide, cumene hydroperoxide, t-butylperoxy-2-ethyl hexanoate and the like; azo compounds, such as azobisisobutylonitrile, 2,2'-azobis(2,4-dimethylvaleronitrile), 2,2'-azobis(4-methoxy-2,4-dimethylvaleronitrile), dimethyl 2,2'-azobisisobutylate and the like; and a mixture thereof. The amount of the initiator is within the range of 0.1 to 15% by weight, preferably 0.5 to 1% by weight based on the amount of the vinyl monomer.

The dispersion polymerization stabilizer of the present invention can be anyone which is soluble in the dispersion medium, including celluloses, such as hydroxyethyl cellulose, hydroxypropyl cellulose, cellulose acetate butylate, hydroxybutylmethyl cellulose, hydroxypropylmethyl cellulose, propionic cellulose and the like; polyvinyl alcohols, such as polyvinyl acetate, ethylene-vinyl alcohol copolymer, vinyl alcohol-vinyl acetate copolymer and the like; other polymers, such as polyvinyl pyrrolidone, polyacrylic acid, polyvinyl methyl ether, acrylic acid, styrene-acrylic resin and the like; condensed polymers, such as polyester resin, polyethyleneimine and the like; and a mixture thereof. Amphoteric ion-containing resin as described in Japanese Kokai Publications 151727/1981 and 40522/1982 can also be employed in the present invention. In order to narrow the particle size distribution of the toner particles, the stabilizer may contain radical polymerizable groups or chain transfer groups if necessary (see Japanese Kokai Publication 304002/1988). The dispersion polymerization stabilizer may preferably be present in an amount of 3 to 30% by weight based on the total amount of the vinyl monomer, but amounts outside the range can also be used.

The dispersion polymerization in the present invention can be carried out in a dispersion medium which dissolves the vinyl monomer, the dispersion polymerization stabilizer and the polymerization initiator and which does not dissolve the silicone-containing organic resin microparticles and the resulting toner particles. Examples of the dispersion mediums are alcohols, such as methanol, ethanol, n-propanol, i-propanol, n-butanol, i-butanol, t-butanol, n-hexanol, cyclohexanol, ethylene glycol, propylene glycol and dipropylene glycol; ether alcohols, such as ethyleneglycol monomethyl ether, ethyleneglycol monoethyl ether, ethyleneglycol monobutyl ether, propyleneglycol monomethyl ether, propyleneglycol monoethyl ether, propyleneglycol monobutyl ether, diethyleneglycol monomethyl ether, diethyleneglycol monoethyl ether, diethyleneglycol monobutyl ether, dipropyleneglycol monomethyl ether and dipropyleneglycol monoethyl ether; a mixture thereof; and the like. Water may be added to the above medium up to 50 parts by weight based on 100 parts by weight of the medium.

In the dispersion polymerization, a coloring agent and other additives (e.g. magnetic powder (magnetite), polyethylene wax, polypropylene wax, silicon compounds) may be added. Typical examples of the coloring agents are inorganic pigments, organic pigments and dyes, including carbon black, Cinquacia red, disazo yellow, Carmine 6B direct yellow, direct blue and the like. The coloring agent and the additives are formulated into the reaction system in an amount of 3 to 50% by weight. It is preferred that the surface of the inorganic pigments is subjected to polymer grafting to stably disperse the pigments. The method of the polymer grafting is known to the art, for example in Japanese Kokai Publication 23133/1980.

The dispersion polymerization may be carried out at a temperature of 5° to 150° C. under a nitrogen atmosphere for 5 to 25 hours, but those conditions do not limit the present invention.

According to the present invention, since the dispersion polymerization is carried out in the presence of the silicone-containing organic resin microparticles, the silicone is included in the toner in the form of microparticles and the amount of the silicone in the toner can be widely varied. The silicone is uniformly contained in the toner and effectively prevents blocking. The toner of the present invention is very useful for electrophotography and effectively prevents off set without other removers.

EXAMPLES

The present invention is illustrated by the following Examples which, however, are not to be construed as limiting the present invention to their details.

PRODUCTION EXAMPLE 1

Synthesis of silicone-containing acryl microparticles (I)

A two liter flask was charged with 800 parts by weight of deionized water and 8 parts by weight of dodecylbenzenesulfonic acid, and heated to 85° C. with stirring. Next, 400 parts by weight of octamethylcyclotetrasiloxane, 8 parts by weight of Perex SS-L (sodium alkyl diphenyl ether disulfonate surfactant available from Kao Corp.) and 400 parts by weight of deionized water were mixed to form an emulsion which was added dropwise to the flask for 2 hours. After reacting 5 hours, it was cooled and neutralized with a 2N sodium carbonate solution.

An emulsion was prepared by mixing, using a homogenizer, 304 parts by weight of the resulting silicone seed emulsion, 105 parts by weight of styrene, 45 parts by weight of n-butyl methacrylate, 10 parts by weight of ethyleneglycol dimethacrylate, 40 parts by weight of 2-hydroxyethyl methacrylate and 414 parts by weight of deionized water, and then charged in a two liter flask, which was heated to 80° C. A solution of one part by weight of potassium persulfate and 150 parts by weight of deionized water was added dropwise for one hour and reacted for 3 hours and cooled. The emulsion had a nonvolatile content of 26.0% and contained silicone-containing acryl microparticles (I) having an average particle size of 80 nm which was determined by a light scattering method.

PRODUCTION EXAMPLE 2

Synthesis of silicone-containing acryl microparticles (II)

An emulsion was prepared by mixing, using a homogenizer, 809 parts by weight of the silicone seed emulsion of Production Example 1, 33.6 parts by weight of styrene, 14.4 parts by weight of n-butyl methacrylate, 3 parts by weight of ethyleneglycol dimethacrylate, 9 parts by weight of 2-hydroxyethyl methacrylate, 91 parts by weight of deionized water and 0.3 parts by weight of potassium persulfate, and then charged in a two liter flask, which was heated to 80° C. with stirring. After reacting for 4 hours, the resulting emulsion had a nonvolatile content of 26.3% and contained silicone-containing acryl microparticles (II) having an average particle size of 110 nm which was determined by the light scattering method.

PRODUCTION EXAMPLE 3

Synthesis of acryl microparticles

A one liter flask equipped with a stirrer, a dropping funnel, a thermometer and a nitrogen introducing tube was charged with 280 parts by weight of deionized water, to which 35 parts by weight of styrene, 18 parts by weight of methyl methacrylate, 18 parts by weight of n-butyl methacrylate, 16 parts by weight of ethyleneglycol dimethacrylate and 3 parts by weight of sodium dodecylbenzenefulfonate were added dropwise at 80° C. for 2 hours. One part by weight of 4,4'-azobis-4-cyanovaleric acid was neutralized with an alkali and dissolved in 20 parts by weight of deionized water, which was added to the flask simultaneously with the monomer mixture to conduct an emulsion polymerization.

The reaction product had a nonvolatile content of 25.0% and had an average particle size of 260 nm which was determined by the light scattering method. It was then dried to obtain acryl microparticles.

PRODUCTION EXAMPLE 4

Preparation of carbon black paste

A pigment paste was prepared by grinding for 3 hours in an SG mil 100 parts by weight of carbon black, 600 parts by weight of styrene, 200 parts by weight of n-butyl methacrylate, 20 parts by weight of a carbon grinding resin having an amine equivalent of 1 mmol/g and an average molecular weight 12,000 (available from Nippon Paint Co., Ltd.) and 1,000 parts by weight of glass beads and then removing the glass beads.

EXAMPLE 1

A one liter flask equipped with a stirrer, a thermometer, a temperature controlling bar and a condenser was charged with 45 parts by weight of the emulsion of the silicone-containing acryl microparticles (I) of Production Example 1, 320 parts by weight of n-propyl alcohol, 47 parts by weight of deionized water, 15 parts by weight of a partially saponified polyvinyl acetate and 90 parts by weight of the carbon black paste of Production Example 4, and heated to 85° C. To the contents, a mixture of 4 parts by weight of lauroyl peroxide, 4 parts by weight of 1,1'-azobis(cyclohexane-1-carbonitrile) and 20 parts by weight of styrene was added and reacted at 85° C. for 18 hours.

The resulting mixture was centrifuged and the sediment was rinsed with methanol and dried to form a toner having an average particle size of 7 microns which contained silicone.

EXAMPLE 2

A silicone-containing toner having an average particle size of 8.2 microns was prepared as generally described in Example 1, with the exception that the amount of the silicone-containing acryl microparticles of Production Example 1 was changed to 67.5 parts by weight and the amount of deionized water was changed to 30 parts by weight.

EXAMPLE 3

A silicone-containing toner having an average particle size of 5.7 microns was prepared as generally described in Example 1, with the exception that the silicone-containing acryl microparticles of Production Example 1 was changed to that of Production Example 2.

EXAMPLE 4

A silicone-containing toner having an average particle size of 6.8 microns was prepared as generally described in Example 1, with the exception that the silicon-containing acryl microparticles of Production Example 1 was changed to 30 parts by weight of that of Production Example 2 and the amount of deionized water was changed to 57.9 parts by weight.

EXAMPLE 5

One hundred parts by weight of the acryl microparticles obtained in Production Example 3 was mixed with 30 parts by weight of a silicone having a viscosity of 100 cp (available from Shin-Etsu Chemical Co., Ltd. as KF-96) to absorb the silicone into the microparticles.

A pigment paste was prepared by grinding for 1 hour in an SG mil 130 parts by weight of the above obtained silicone-containing microparticles, 100 parts by weight of carbon black, 100 parts by weight of styrene, 200 parts by weight of n-butyl methacrylate, 30 parts by weight of a carbon grinding resin having an amine equivalent of 1 mmol/g and an average molecular weight 12,000 (available from Nippon Paint Co., Ltd.) and 1,000 parts by weight of glass beads and then removing the glass beads.

A silicone-containing toner having an average particle size of 7.3 microns was prepared as generally described in Example 1, with the exception that 100 parts by weight of the above obtained silicone-containing acryl microparticles was employed instead of the carbon black paste of Production Example 4.

EXPERIMENT 1

Spherical ferites having an average particle size of 70 micrometers were covered with styrene-methyl methacrylate copolymer to obtain a carrier. A developer was prepared by mixing 100 parts by weight of the carrier and 2.5 parts by weight of each one of the toners of Examples 1 to 5. An off set test was conducted using a copy machine (available from Sharp Corporation as SF-8800 and the results are shown in Table 1.

For comparison, a ground toner which contained 3% by weight of silicone was employed and the same test was conducted.

TABLE 1

| Examples | Off set[1] | Blocking properties[2] |
|---|---|---|
| 1 | Good | Very good |
| 2 | Very good | Very good |
| 3 | Very good | Good |
| 4 | Very good | Good |
| 5 | Good | Good |
| Control | Good | Poor |

[1]Very good shows no off set and Very bad shows that a copy paper was never removed. Good and poor are somewhere therebetween.
[2]Ten grams of a toner was stored at 40° C. for 3 days in a 50 ml sample bottle and then the toner was taken out. Very good shows no heat blocking and very poor shows that the toner was never taken out from the bottle even when the bottle was turned over and the bottom was tapped by fingers. Good and poor shows somewhere therebetween.

What is claimed is:

1. A process for preparing a toner comprising dispersion-polymerizing a vinyl monomer in the presence of a dispersion polymerization stablizer, a polymerization initiator and silicone-containing organic resin microparticles in a dispersion medium which dissolves said vinyl monomer, dispersion polymerization stabilizer and polymerization initiator and which does not dissolve said silicone-containing organic resin microparticles and resulting toner particles, wherein the silicone in said silicone-containing organic resin microparticles has a viscosity of 10 to 10,000 cp.

2. The process according to claim 1 wherein said silicone-containing organic resin microparticles are prepared by a method wherein silicone is absorbed in organic resin microparticles, a method wherein a silicone emulsion is employed as a seed and an emulsion polymerization of an acryl monomer is conducted thereon, or a method wherein silicone is grafted with acryl polymer to form microparticles.

3. The process according to claim 1 wherein a weight ratio of the silicone/organic resin microparticles is within the range of 80/20 to 5/95.

4. The process according to claim 1 wherein said silicone-containing organic resin microparticles have an average particle size of 0.03 to 1.0 micron.

5. The process according to claim 1 wherein said silicone-containing organic resin microparticles are present in an amount of 0.1 to 30.0% by weight (i.e. 0.005 to 24.0% by weight calculated in terms of the silicone) based on the amount of said vinyl monomer.

6. The process according to claim 1 wherein said polymerization initiator is a peroxide or azo compound.

7. The process according to claim 1 wherein an amount of said initiator is within the range of 0.1 to 15% by weight based on the amount of the vinyl monomer.

8. The process according to claim 1 wherein said dispersion polymerization stabilizer is selected from the group consisting of celluloses, polyvinyl alcohols, polyvinyl pyrrolidone, polyacrylic acid, polyvinyl methyl ether, acrylic acid, styrene-acrylic resin, polyester resin, polyethyleneimine and a mixture thereof.

9. The process according to claim 1 wherein said stabilizer contains radical polymerizable groups or chain transfer groups.

10. The process according to claim 1 wherein said polymerization stabilizer is present in an amount of 3 to 30% by weight based on the total amount of the vinyl monomer.

11. The process according to claim 1 wherein said dispersion medium includes alcohols, ether alcohols and a mixture thereof.

12. The process according to claim 1 wherein said dispersion medium contains water up to 50% by weight.

13. The process according to claim 1 wherein said dispersion polymerization is carried out at a temperature of 5° to 150° C. under a nitrogen atmosphere for 5 to 25 hours.

* * * * *